United States Patent
Yamada (10) Patent No.: US 8,029,046 B2
(45) Date of Patent: Oct. 4, 2011

(54) FRONT VEHICLE BODY STRUCTURE

(75) Inventor: Takayuki Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/608,385

(22) Filed: Oct. 29, 2009

(65) Prior Publication Data

US 2010/0109370 A1    May 6, 2010

(30) Foreign Application Priority Data

Oct. 30, 2008 (JP) .................. 2008-279575

(51) Int. Cl.
*B62D 25/00* (2006.01)
*B62D 25/14* (2006.01)

(52) U.S. Cl. ......... 296/193.02; 296/187.09; 296/187.12; 296/205; 296/203.02; 296/203.03; 296/70

(58) Field of Classification Search ............ 296/187.09, 296/187.12, 190.03, 193.02, 193.09, 205, 296/203.02, 203.03, 70

See application file for complete search history.

(56) References Cited

U.S. PATENT DOCUMENTS

| | | | | | |
|---|---|---|---|---|---|
| 3,292,969 | A | * | 12/1966 | Eggert, Jr. | 296/205 |
| 6,179,372 | B1 | * | 1/2001 | Sakamoto et al. | 296/203.02 |
| 6,371,767 | B1 | * | 4/2002 | Libby | 434/373 |
| 6,860,547 | B2 | * | 3/2005 | Winter et al. | 296/193.02 |
| 6,874,843 | B2 | * | 4/2005 | Awano et al. | 296/203.02 |
| 6,948,768 | B2 | * | 9/2005 | Corcoran et al. | 296/190.08 |
| 7,441,830 | B2 | * | 10/2008 | Caliskan et al. | 296/204 |
| 7,798,562 | B2 | * | 9/2010 | Wrobel et al. | 296/193.02 |
| 2002/0149235 | A1 | * | 10/2002 | Alderson | 296/205 |
| 2006/0186699 | A1 | * | 8/2006 | Davis et al. | 296/187.01 |
| 2010/0102596 | A1 | * | 4/2010 | Chapman | 296/193.03 |

FOREIGN PATENT DOCUMENTS

JP    2004-067082    3/2004

\* cited by examiner

*Primary Examiner* — Jason S Morrow
(74) *Attorney, Agent, or Firm* — Rankin, Hill & Clark LLP (57) ABSTRACT

Dashboard panel, partitioning between an engine compartment and a passenger compartment, includes a reinforcing frame structure or connection member that extends, through the interior space of the dashboard panel, to linearly interconnect a horizontal rear end portion of each of left and right front side frames and a front end portion of a corresponding one of left and right side sills.

11 Claims, 8 Drawing Sheets

FIG.11A
(COMP. EX.)

FIG.11B
(EMBODIMENT)

FRONT VEHICLE BODY STRUCTURE

FIELD OF THE INVENTION

The present invention relates to an improved front vehicle body structure in which sections at and around a dashboard panel partitioning between an engine compartment (or engine space) and a passenger compartment have increased rigidity.

BACKGROUND OF THE INVENTION

Among the conventionally-known front vehicle body structures are ones employed in vehicles where an engine is oriented transversely in an engine compartment. In the front vehicle body structures of that type, left and right side regions of a dashboard panel, which functions as a partition wall between the engine compartment and the passenger compartment, are each formed in an arch shape to provide a wheel arch section; parts of these left and right wheel arch sections arcuately project into left and right side regions of the passenger compartment, in order to not interfere with steering movement of tires of left and right road wheels.

One example of such front vehicle body structures is disclosed in Japanese Patent Application Laid-Open Publication No. 2004-67082 (JP 2004-067082 A), where a front section of the passenger compartment is surrounded by pipe members in order to transmit a load, applied from front side frames, to left and right front pillars (commonly known as A-pillars) and left and right side sills. More specifically, the front vehicle body structure disclosed in JP 2004-67082 A includes: the dashboard panel (end wall) disposed between the engine compartment and the passenger compartment; left and right front side members connected to the dashboard panel; left and right side sills disposed on left and right outer sides of the vehicle body; left and right front pillars (A-pillars) projecting upward from the left and right side sills; and a vehicle body floor extending from the dashboard panel and spanning between the left and right side sills.

Load input from the engine compartment to the passenger compartment (cabin) comprises one from upper members and one from lower side frames, and these input is primarily due to vibration of front wheels transmitted via component parts of suspensions, such as dampers. For a load input via the front side frame, there is a need to increase rigidity of the dashboard because the dashboard panel functions as a reacting point or surface against such a load input.

However, if a reinforcing member, such as a cross member or pipe member, is provided outside the wheel arch sections of the dashboard panel in the front vehicle body structure, the reinforcing member would interfere with the front wheels (tires) and thus create layout limitations in the front section of the vehicle body. Thus, it is difficult to provide such a reinforcing member outside the wheel arch sections. If, on the other hand, such a reinforcing member is provided inside the passenger compartment, the space inside the passenger compartment would be sacrificed.

SUMMARY OF THE INVENTION

In view of the foregoing prior art problems, it is an object of the present invention to provide an improved front vehicle structure which can not only transmit a load from the front side frames directly to the side sills but also reduce an amount of deformation and flexure of the dashboard panel while securing a sufficient layout freedom in a front section of the vehicle body and securing a sufficient space within the passenger compartment.

In order to accomplish the above-mentioned object, the present invention provides an improved front vehicle body structure, which comprises: a dashboard panel partitioning between an engine compartment and a passenger compartment; left and right front side frames extending from the dashboard panel toward a front of the vehicle body; left and right side sills extending from the dashboard panel toward a rear of the vehicle body; and a connection member extending, through an interior space of the dashboard panel, to linearly interconnect a horizontal rear end portion of each of the left and right front side frames and a front end portion of a corresponding one of the left and right side sills.

With the connection member linearly interconnecting the horizontal to rear end portion of each of the left and right front side frames and the front end portion of the corresponding side sill, a load input from the front side frames can be transmitted directly and smoothly to the side sills. Further, because the connection member extends through the interior of the dashboard panel, the present invention can secure a sufficient layout freedom in a front section of the vehicle body and a secure a sufficient space within the passenger compartment.

Preferably, the connection member is fixed at opposite end portions thereof to portions of the respective outer peripheries of left and right wheel arch sections of the dashboard panel. Because the wheel arch sections are high-rigidity arch-shaped sections provided in the dashboard panel and the reinforcing frame structure is fixed to a portion of the outer periphery of each of the wheel arch sections, it is possible to effectively reduce an amount of deformation and flexure of the dashboard panel.

Desirably, the connection member is not only connected at its opposite end portions to the left and right wheel arch sections of the dashboard panel but also fixed to a front side frame covering member from which the left and right front side frames are extended forward, the connection member being sandwiched between the front side frame covering member and a central panel section of the dashboard panel. Thus, the above-mentioned connection member can be provided to extend through the interior of the dashboard panel, so that the present invention can effectively reinforce the dashboard panel.

Preferably, portions of the connection member which are located adjacent to the left and right wheel arch sections of the dashboard panel are covered with a lower section of the dashboard panel. Thus, the rigidity of the dashboard panel can be further enhanced through a synergetic effect achieved by fixed connection between the connection member and the wheel arch sections. Further, the connection between the connection member and the side sills can be facilitated.

Desirably, the front vehicle body structure further comprises left and right connection members (pillar reinforcing frames) disposed within corresponding ones of left and right front pillars to reinforce the left and right front pillars. The front vehicle body structure may further comprise a connection member connecting to a floor tunnel frame to reinforce the tunnel frame. The front vehicle body structure may further comprise a connection member interconnecting the left and right side frames.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

In the following description, the terms "front", "rear", "left" and "right", "upward" and "downward" are used to refer to directions as viewed from a human driver driving a vehicle.

Figure 1:
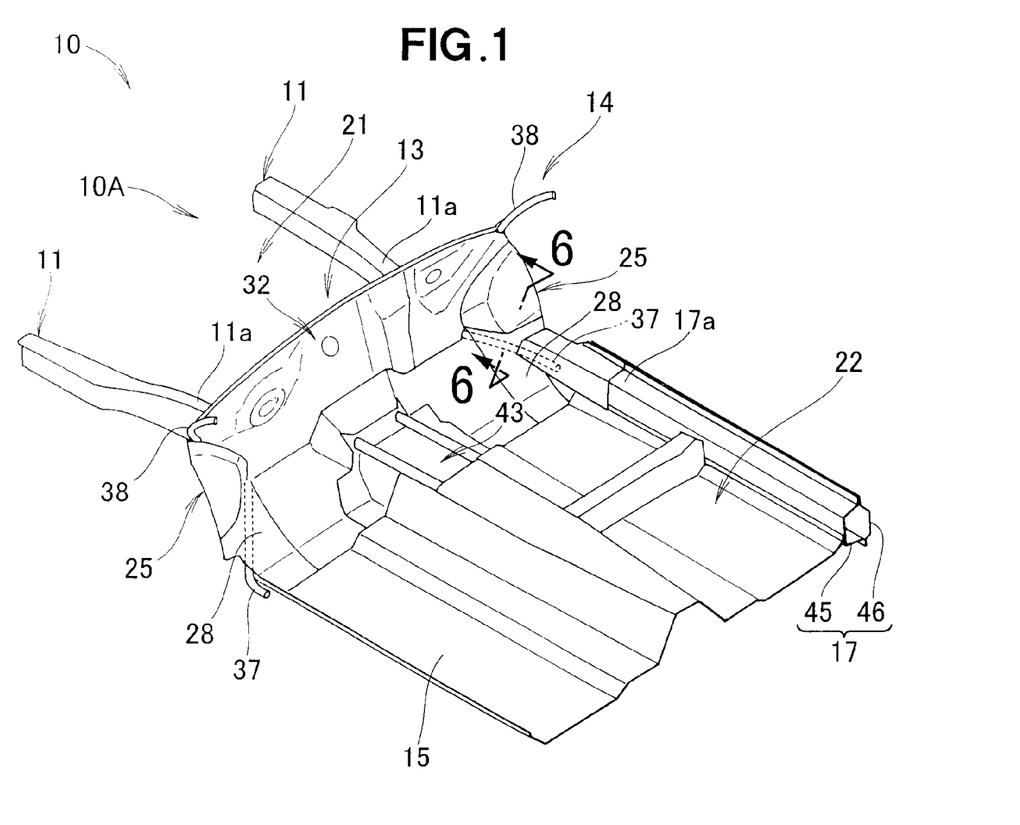
FIG. 1 is a perspective view of a front vehicle body structure according to an embodiment of the present invention.
Figure 2:
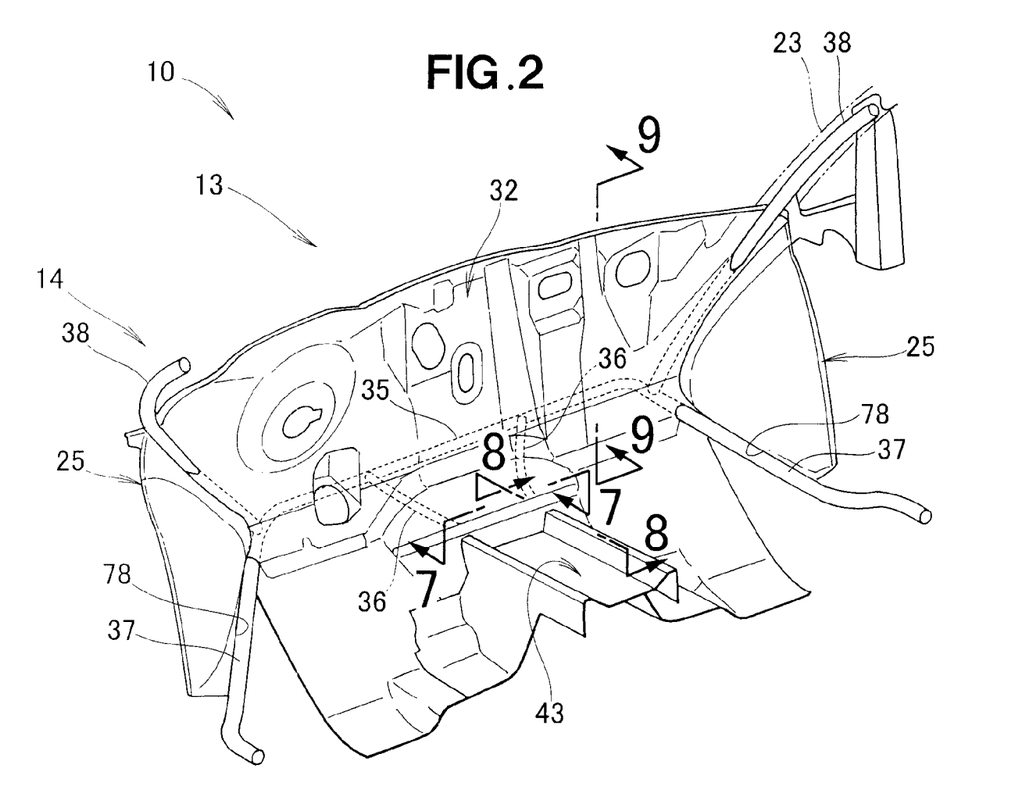
FIG. 2 is a perspective view showing sections at and around a dashboard panel of the front vehicle body structure of FIG. 1 as viewed from inside of a passenger compartment.

FIG. 1 is a perspective view of a front vehicle body structure according to an embodiment of the present invention, and FIG. 2 is a perspective view showing sections at and around a dashboard panel of the front vehicle body structure as viewed from inside of a passenger compartment.

The vehicle body 10A includes: the dashboard panel 13 partitioning between an engine compartment 21 and the passenger compartment 22; left and right front side frames 11 extending from the dashboard panel 13 toward the front of the vehicle body; a center tunnel or floor tunnel (also referred to as "floor tunnel frame") 43 extending from a middle portion of the dashboard panel 13 toward a rear of the vehicle body; left and right sills 17 (only one of which is shown in the figures) extending from the dashboard panel 13 toward the rear of the vehicle body; front pillars (A-pillars) 23 (only one of which is shown in the figures) extending obliquely upward from left and right sides of the dashboard panel 13; and a vehicle body floor (front floor) 15 extending from the dashboard panel 13 toward the rear of the vehicle body.

The left and right front side frames 11 are spaced from each other by a predetermined distance in a width direction of the vehicle body, extend in a front-rear direction of the vehicle body, and are fixedly joined at their horizontal rear end portions 11a to the dashboard panel 13.

The side sills 17, which are frame members provided along lower left and right side edges of the passenger compartment 22 to support the vehicle body floor 15, and fixedly joined at their front end portions 17a to the dashboard panel 13. Each of the side sills 17 includes inner and outer side sill members 45 and 46. The front pillars 13 extend from the left and right sides of the dashboard panel 13 obliquely rearwardly and upwardly.

Figure 3:
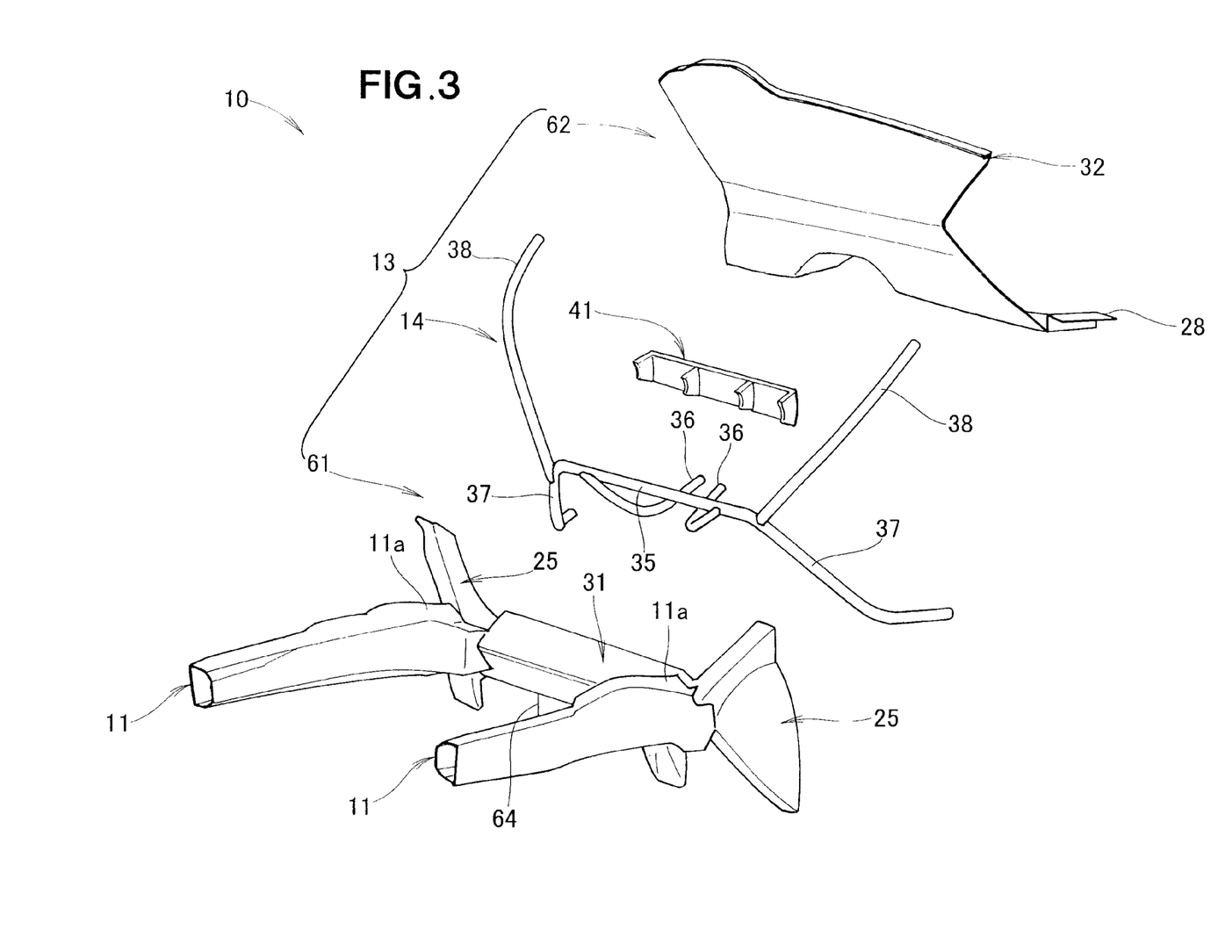
FIG. 3 is an exploded perspective view of the dashboard panel of the front vehicle body structure shown in FIG. 1.
Figure 4:
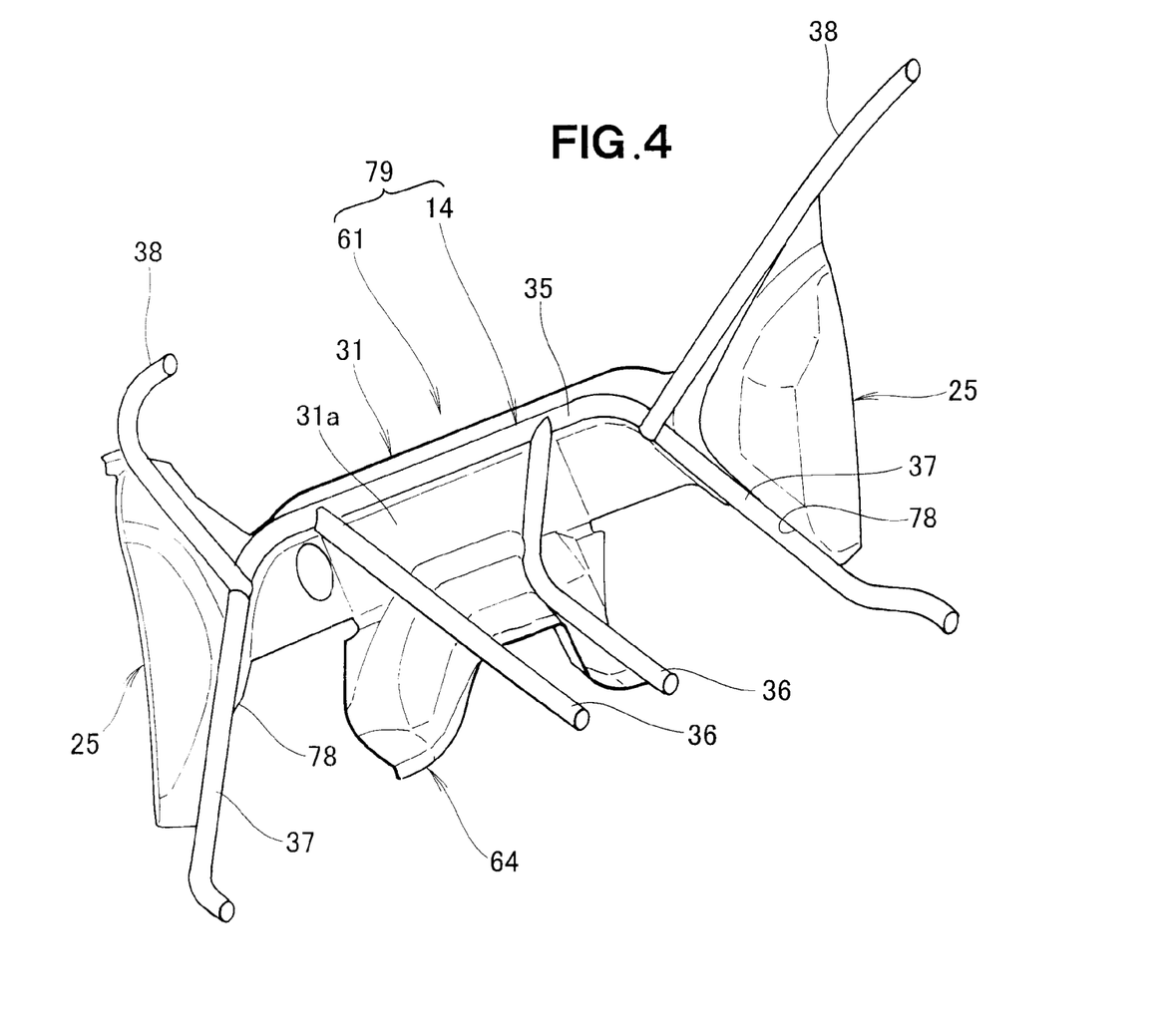
FIG. 4 is a perspective view of the dashboard panel with its rear divided member taken away.

FIG. 3 is an exploded perspective view of the dashboard panel 13 of the front vehicle body structure shown in FIG. 1, and FIG. 4 is a perspective view of the dashboard panel 13 with its rear divided member taken away.

The dashboard panel 13 includes a front divided member 61 disposed adjacent to the engine compartment 21, the rear divided member 62 disposed adjacent to the passenger compartment 22, and a reinforcing frame structure (or connection member or dashboard reinforcing member) 14 disposed between the front divided member 61 and the rear divided member 62 via a connection member 41. The connection support member 41 is disposed between the rear divided member 62 and the reinforcing frame structure 14.

The front divided member 61 of the dashboard panel 13 includes: a front side frame covering member (front board panel) 31 from which the left and right front side frames 11 extend forward; a lower dashboard panel section (tunnel reinforcing plate) 64 extending rearward from a middle lower portion of the front side frame covering member 31 to connect to the floor tunnel (floor tunnel frame) 43; and left and right arch-shaped sections (i.e., wheel arch sections) 25 provided on left and right sides of the front side frame covering member 31 and surrounding left and right front wheels (not shown).

The rear divided member 62 of the dashboard panel 13 includes a central panel (rear board panel) section 32 partitioning the vehicle body 10A into an engine-compartment-side section and a passenger-compartment-side section, and lower side panel sections (lower dashboard panel sections) 28 provided integrally with opposed lower side portions of the central panel section 32 to connect to the left and right side sills 17.

The reinforcing frame structure (connection member) 14 includes: a cross member (central connection member) 35 interconnecting the left and right side frames 11; left and right side sill reinforcing frames (i.e., connection members under the wheel arch sections 25) 37 reinforcing the front portions 17a of the left and right side sills 17; left and right pillar reinforcing frames (i.e., connection members over the wheel arch sections 25) 38 disposed within the A pillars 23 for reinforcing the A pillars 23; a tunnel reinforcing frame (tunnel frame connecting members) 36 connecting to the floor tunnel frame 43 for reinforcing the floor tunnel frame 43.

The cross member 35 and the side sill reinforcing frames 37 are formed integrally by bending a single pipe member, the side sill reinforcing frames 37 extend substantially linearly through the wall thickness of the dashboard panel 13, and the cross member 35 extend crosswise of the vehicle body through the interior of the dashboard panel 13.

The pillar reinforcing frames 38 are straight pipe members welded at their respective one ends (lower ends) to the corresponding side sill reinforcing members 37 near the proximal ends of the members 37 and extending linearly through the wall thickness of the rear divided member 62 of the dashboard panel 13. The tunnel reinforcing frames 36 are formed by welding pipe members to the cross member 35.

Figure 5:
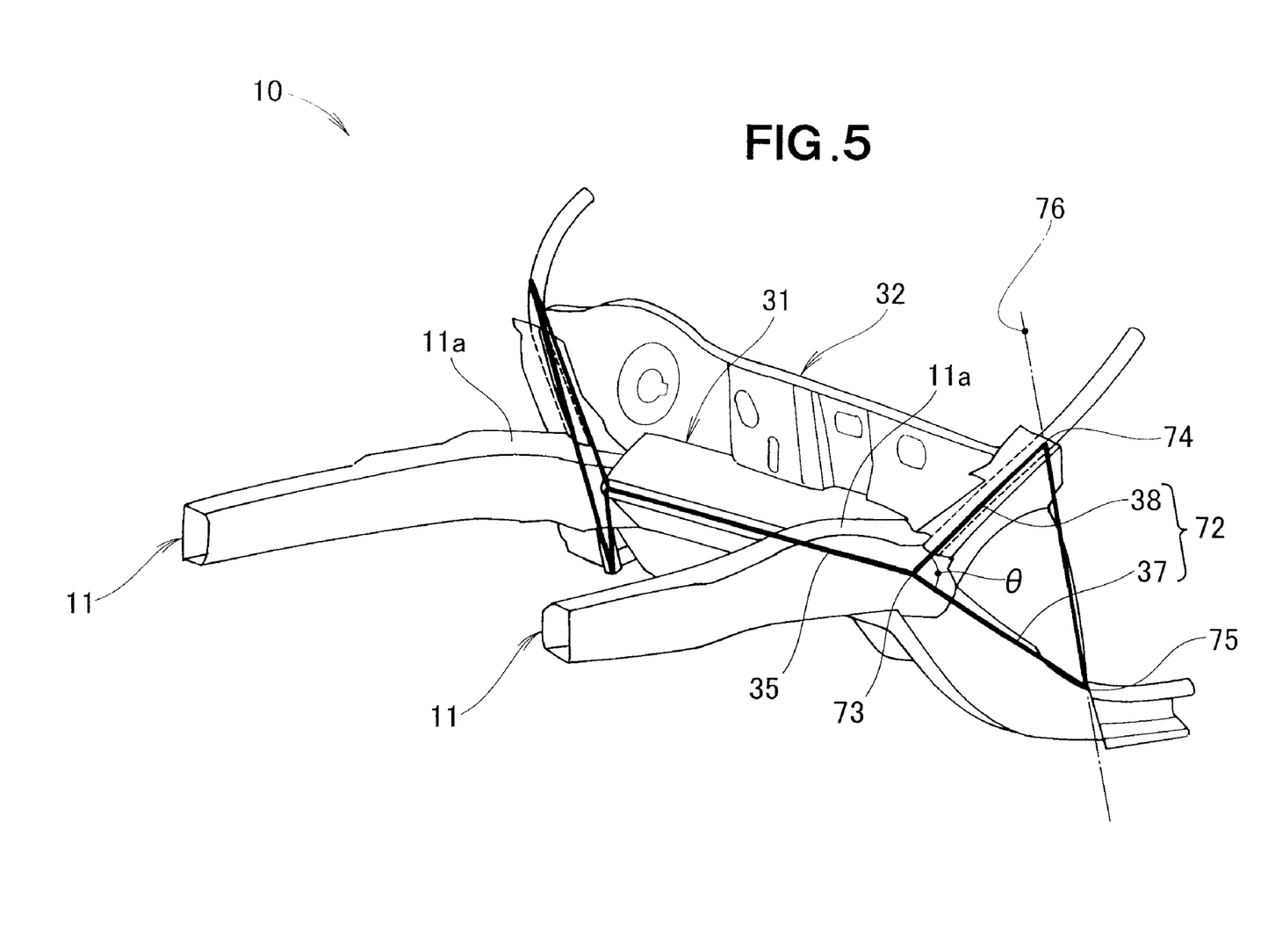
FIG. 5 is a perspective view schematically showing a reinforcing frame structure of the front vehicle body structure shown in FIG. 1.

FIG. 5 is a perspective view schematically showing the reinforcing frame structure 14 of the front vehicle body structure shown in FIG. 1. Further, in the front vehicle body structure 10, each of the pillar reinforcing frames 38 and the corresponding side sill reinforcing frame 37 together constitute a bifurcated reinforcing member 72. Portion where the pillar reinforcing frame 38 and the side sill reinforcing frame 37 will hereinafter be referred to as an intersecting portion 73. The bifurcated reinforcing section 72 has an intersecting angle θ of 60 degrees at the intersecting portion 73.

If a lower mounting point 74 of each of the front pillars and a mounting point 75 of the corresponding side sill is interconnected by an imaginary line 76 as shown in FIG. 5, then a generally regular triangle is defined by the intersecting portion 73, lower mounting point 74 of the front pillar and mounting point 75 of the side sill. The intersecting portion 73 is connected to the cross member 35, and it is also an inner mounting point that is mounted to the inner surface of the front side frame 11 via the cross member 35 and front side frame covering member 31.

Figure 6:
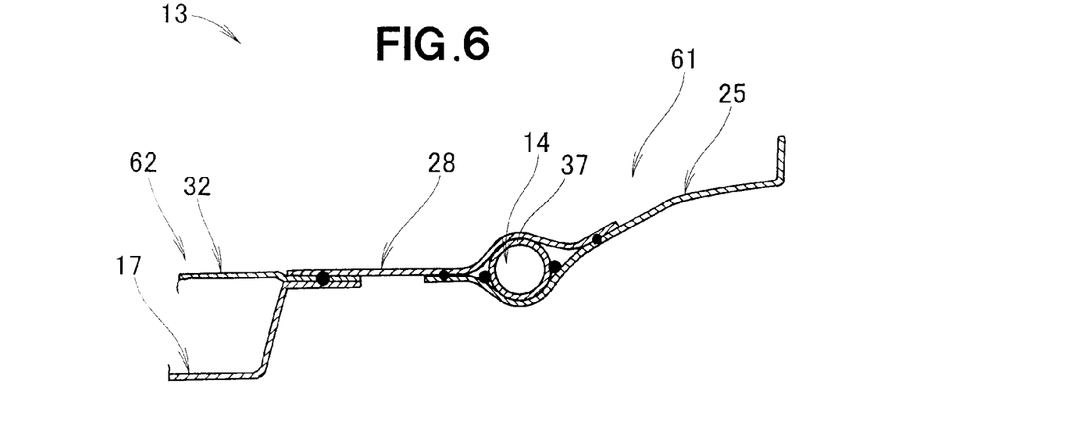
FIG. 6 is a sectional view taken along line 6-6 of FIG. 1.
Figure 7:
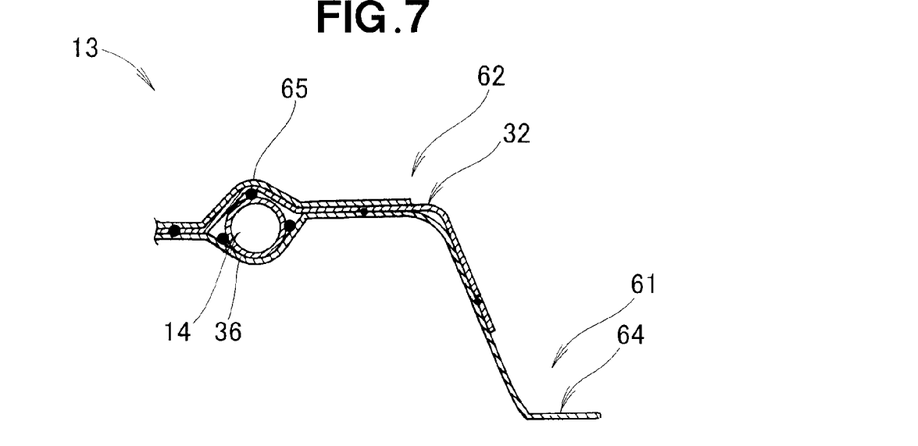
FIG. 7 is a sectional view taken along line 7-7 of FIG. 2.
Figure 8:
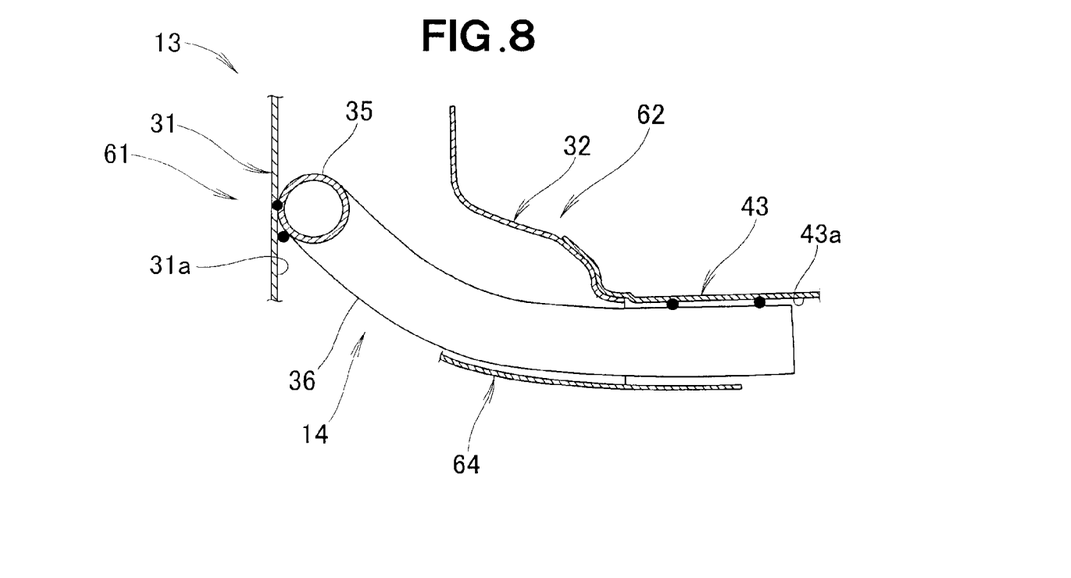
FIG. 8 is a sectional view taken along line 8-8 of FIG. 2.
Figure 9:
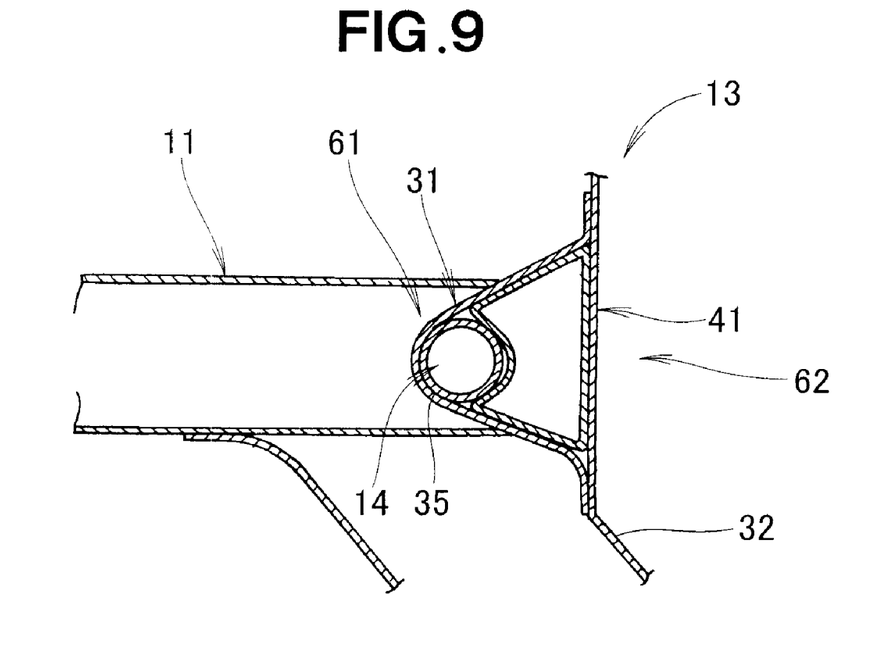
FIG. 9 is a sectional view taken along line 9-9 of FIG. 2.
Figure 10:
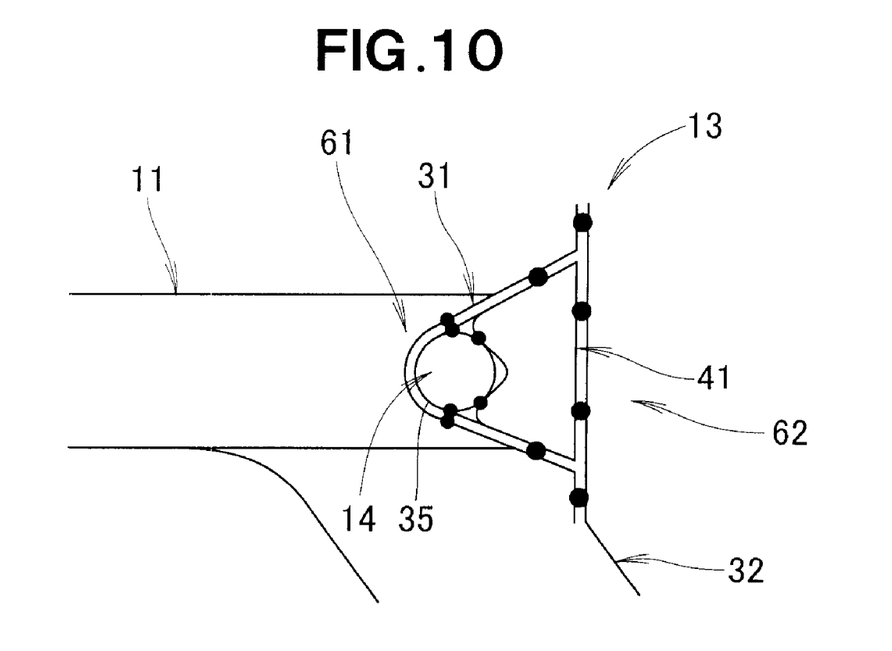
FIG. 10 is a view showing welded portions on and around the dashboard panel shown in FIG. 9.

FIG. 6 is a sectional view taken along the 6-6 line of FIG. 1, FIG. 7 is a sectional view taken along the 7-7 line of FIG. 2, FIG. 8 is a sectional view taken along the 8-8 line of FIG. 2, FIG. 9 is a sectional view taken along the 9-9 line of FIG. 2, and FIG. 10 is a view showing welded portions on and around the dashboard panel 13. Note that black round dots in FIGS. 6-8 and 10 represent welded portions.

In the front vehicle body structure 10, as shown in FIG. 6, each of the wheel arch sections 25 of the front divided member 61 of the dashboard panel 13 is welded with the corresponding side reinforcing frame 37 of the reinforcing frame structure 14 and with the corresponding lower side panel section 28 of the rear divided member 62, and the central panel section 32 and the side sill 17 are welded to the lower side panel section 28.

Namely, each of the side sill reinforcing frames 37 is not only fixedly connected to the outer periphery 78 (see FIG. 2) of the corresponding wheel arch section 25 of the front divided member 61, but also covered with the corresponding lower side panel section 28 (i.e., lower section of the dashboard panel 13).

Further, as shown in FIG. 7, the central panel section 32 of the rear divided member 62 is welded to lower dashboard panel section 64 of the front divided member 61, and the tunnel reinforcing frame 36 of the reinforcing frame structure 14 is welded to the lower dashboard panel section 64 and central panel section 32. Further, the central panel section 32 is reinforced with a joint member 65 formed of cast aluminum.

Furthermore, in the front vehicle body structure 10, as shown in FIG. 8, the tunnel reinforcing frame 36 of the reinforcing frame structure 14 is welded or joined to the rear surface 31a of the front side frame covering member 31 of the front divided member 61 and extends through a space between the lower dashboard panel section 64 of the front divided member 61 and the central panel section 32 of the rear divided member 62 so that it is joined to the inner surface of an upper portion 43a of the floor tunnel 43. Note that the cross member (central connection member) 35 of the reinforcing frame structure 14 too is welded or joined to the rear surface 31a of the front side frame covering member 31.

Furthermore, in the front vehicle body structure, as shown in FIGS. 9 and 10, the connection support member 41 and the front side frame covering member 31 of the front divided member 61 are welded to the central panel section 32 of the rear divided member 62. Also, the connection support member 41 and front side frame 11 are welded to the front side frame covering member 31, and the cross member 35 is welded to the front side frame covering member 31 and the connection support member 41.

Namely, the cross member (central connection member) 35 is not only fixed to the front side frame covering member 31 of the dashboard panel 13 but also held or sandwiched between the front side frame covering member 31 and the central panel section 32 via the connection support member 41.

The following describe how to assemble the instant embodiment of the front vehicle body structure 10. As shown in FIG. 4, the reinforcing frame structure (connection member) 14 connecting to the left and right side sills 17, floor tunnel 43 and left and right A-pillars 23 is joined to the front divided member 61 of the dashboard panel 13 integrally having the wheel arch sections 25 and front side frame covering member 31, so as to provide an assembly 79 of the front divided member 61 and the reinforcing frame structure (connection member) 14. At that time, each of the side sill reinforcing frames 37 of the reinforcing frame structure 14 is fixed to and along the outer periphery 78 of the corresponding wheel arch section 25.

Then, as shown in FIG. 3, the assembly 79 of the front divided member 61 and the reinforcing frame structure 14 is fitted into horizontal rear end portions 11a of the front side frames 11 (see also FIG. 5), then the central panel section 32 of the rear divided member 62 is placed on the assembly 79 via the connection support member 41 pressing the reinforcing frame structure 14, and thus, the side sill reinforcing frames 37 are joined to the wheel arch sections 25. Further, slanting sections (not shown) of the front side frames 11, which slant downward to beneath the vehicle body floor 15, are joined to a lower portion of the central panel section 32.

After that, each of the side sill reinforcing frames 37 of the reinforcing frame structure 14 is joined directly to the corresponding side sill 17, then the lower side panel section (i.e., lower section of the dashboard panel 13) 28 is placed on the side sill reinforcing frame 37 from inside the passenger compartment 22, and then the wheel arch sections 25 of the front divided member 61 and the central panel section 32 of the rear divided member 62 are joined together.

Figure 11A:
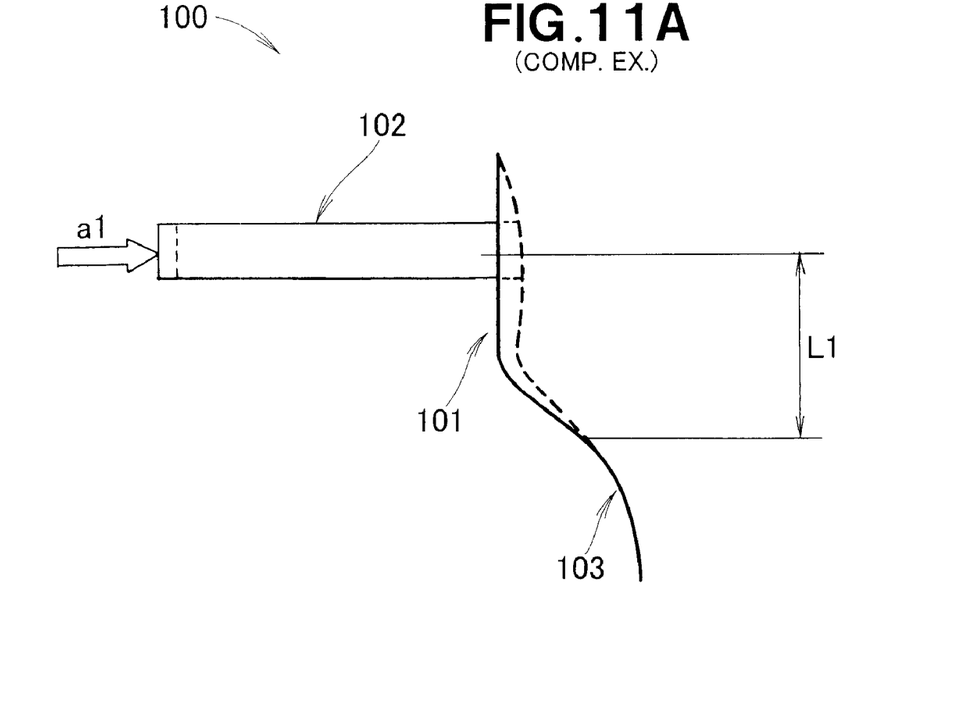
FIGS. 11A and 11B are views comparing the embodiment of the front vehicle body structure to a comparative conventional example.
Figure 11B:
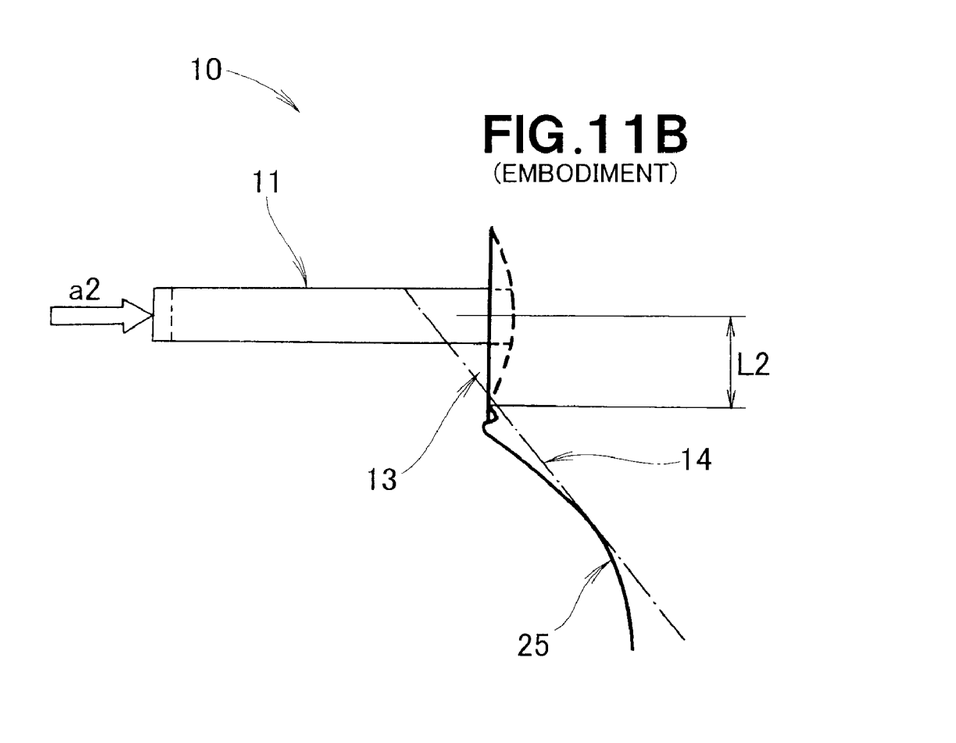

FIGS. 11A and 11B are views comparing the instant embodiment of the front vehicle body structure 10 to a comparative conventional example of the front vehicle body structure 100. In the comparative conventional example 100 shown in FIG. 11A, each of the left and right front side frames 102 is merely connected to the dashboard panel 101. Thus, as a load acts on the front side frame 102 as indicated by arrow a1, the dashboard panel 101 would be deformed over a wide range up to the wheel arch section 103.

In the instant embodiment of the front vehicle body structure 10 shown in FIG. 11B, each of the left and right front side frames 11 is connected to the dashboard panel 13 via the reinforcing frame structure (connection member) 14. Thus, as a load acts on the front side frame 11 as indicated by arrow a2, the dashboard panel 13 would be deformed only over a small limited range, and the load can be smoothly transmitted to the side sill 17 and A-pillar 23 (see FIGS. 1 and 2).

Horizontal length L1 of the deformed range, from a position corresponding to the front side frame 102 to the wheel arch section 103, in the comparative conventional example of the front vehicle body structure 100 is greater than a horizontal length L2 of the deformed range, from a position corresponding to the front side frame 11 to the wheel arch section 25, in the instant embodiment of the front vehicle body structure 10.

Because each of the front side frames 11 is connected to the corresponding wheel arch section 25 via the reinforcing frame structure (connection member) 14 as shown in FIGS. 4 and 9, the reinforcing frame structure 14 can create a supporting point (boundary) in each of the wheel arch sections 25. With such supporting points, it is possible to prevent deformation and flexure of the dashboard panel 13; namely, it is possible to reduce a distance between a load input point and the supporting point (i.e., reacting point) and thus minimize an amount of deformation and flexure of the front side frame 11.

With the left and right front side frames 11 connected with the corresponding side sills 17 via the reinforcing frame structure (connection member) 14, the reinforcing frame structure 14 can transmit a load from the front side frames 11 directly to the side sills 17 and support the wheel arch sections 25 of the dashboard panel 13 to prevent deformation of the wheel arch sections 25. As a result, the instant embodiment of the present invention can increase a load transmitting amount of the dashboard panel 13 and enhance anti-collision performance and rigidity of the vehicle body without sacrificing the layout freedom.

As noted above, the front vehicle body structure 10, which includes: the dashboard panel 13 partitioning between the engine compartment 21 and the passenger compartment 22; the left and right front side frames 11 extending from the dashboard panel 13 toward the front of the vehicle body; and the left and right sills 17 extending from the dashboard panel 13 toward the rear of the vehicle body, further includes the reinforcing frame structure (connection member) 14 extending through the interior of the dashboard panel 13 to interconnect the horizontal rear end portions 11a of the front side frames 11 and the front end portions 17a of the side sills 17. With such a novel reinforcing frame structure 14, a load from the front side frames 11 can be transmitted smoothly to the side sills 17.

Because the reinforcing frame structure 14 extends through an interior space of the dashboard panel 13, the instant embodiment can secure a sufficient layout freedom in the front section of the vehicle body and a secure a sufficient space within the passenger compartment 22.

Further, in the embodiment of the front vehicle body structure 10, where the wheel arch sections 25 are high-rigidity arch-shaped sections provided in the dashboard panel 13 and the reinforcing frame structure (connection member) 14 is fixed to a portion of the outer periphery 78 of each of the wheel arch sections 25, it is possible to effectively reduce an amount of deformation and flexure of the dashboard panel 13.

Furthermore, in the embodiment of the front vehicle body structure 10, the reinforcing frame structure (connection member) 14 is fixed to the front side frame covering member 31 that not only connect to the wheel arch sections 25 of the dashboard panel 13 but also have the front side frames 11 extended therefrom, and the reinforcing frame structure 14 is held or sandwiched between the front side frame covering member 31 and the central panel section 32 of the dashboard panel 13. Thus, the reinforcing frame structure (connection member) 14 can be provided to extend through the interior of the dashboard panel 13. As a result, the instant embodiment can effectively reinforce the dashboard panel 13.

Furthermore, because portions of the reinforcing frame structure (connection member) 14 adjacent to the wheel arch sections 25 are covered with the lower side panel sections (lower sections of the dashboard panel 13) 28, the rigidity of the dashboard panel 13 can be further enhanced through a synergetic effect achieved by the fixed connection between the reinforcing frame structure (connection member) 14 and the wheel arch sections 25. Further, the connection between the reinforcing frame structure (connection member) 14 and the side sills 17 can be facilitated.

The reinforcing frame structure (connection member) 14 employed in the front vehicle body structure 10 of the present invention has been described above as integrally having the cross member 35 and left and right side sill reinforcing frames 37 and having the left and right pillar reinforcing frames 38 welded to the left and right side sill reinforcing frames 37 as shown in FIG. 4. However, the present invention is not so limited; for example, the cross member 35 and the left and right pillar reinforcing frames 38 may be formed integrally, and the left and right side sill reinforcing frames 37 may be welded to the left and right pillar reinforcing frames 38.

The front vehicle body structure of the present invention is well suited for application to passenger cars of a sedan type, wagon type, etc.

What is claimed is:

1. A front vehicle body structure comprising:
  a dashboard panel partitioning between an engine compartment and a passenger compartment;
  left and right front side frames extending from the dashboard panel toward a front of the vehicle body;
  left and right side sills extending from the dashboard panel toward a rear of the vehicle body; and
  a connection member extending, through an interior space of the dashboard panel, to linearly interconnect a horizontal rear end portion of each of the left and right front side frames and a front end portion of a corresponding one of the left and right side sills,
  wherein the connection member is not only connected at opposite end portions thereof to left and right rear arch sections of the dashboard panel but also fixed to a front side frame covering member from which the left and right front side frames are extended forward, the connection member being sandwiched between the front side frame covering member and a central panel section of the dashboard panel.

2. The front vehicle body structure of claim 1, wherein the opposite end portions of the connection member are fixed to portions of respective outer peripheries of left and right wheel arch sections of the dashboard panel.

3. The front vehicle body structure of claim 1, wherein portions of the connection member which are located adjacent to left and right wheel arch sections of the dashboard panel are covered with a lower section of the dashboard panel.

4. The front vehicle body structure of claim 1, further comprising a second connection member connecting to a floor tunnel frame to reinforce the floor tunnel frame.

5. The front vehicle body structure of claim 1, further comprising a third connection member interconnecting the left and right side frames.

6. A front vehicle body structure comprising:
  a dashboard panel partitioning between an engine compartment and a passenger compartment;
  left and right front side frames extending from the dashboard panel toward a front of the vehicle body;
  left and right side sills extending from the dashboard panel toward a rear of the vehicle body;
  a connection member extending, through an interior space of the dashboard panel, to linearly interconnect a horizontal rear end portion of each of the left and right front side frames and a front end portion of a corresponding one of the left and right side sills; and
  left and right elongated connecting members extending from the connection member and disposed within corresponding ones of left and right front pillars to reinforce the left and right front pillars.

7. The front vehicle body structure of claim 6, wherein the connection member is fixed at opposite end portions thereof to portions of respective outer peripheries of left and right wheel arch sections of the dashboard panel.

8. The front vehicle body structure of claim 6, wherein portions of the connection member which are located adjacent to left and right wheel arch sections of the dashboard panel are covered with a lower section of the dashboard panel.

9. The front vehicle body structure of claim 6, which further comprises a second connection member connecting to a floor tunnel frame to reinforce the floor tunnel frame.

10. The front vehicle body structure of claim 6, which further comprises a third connection member interconnecting the left and right side frames.

11. A front vehicle body structure comprising:
a dashboard panel partitioning between an engine compartment and a passenger compartment;
left and right front side frames extending from the dashboard panel toward a front of the vehicle body;
left and right side sills extending from the dashboard panel toward a rear of the vehicle body; and
a connection member extending, through an interior space of the dashboard panel, to linearly interconnect a horizontal rear end portion of each of the left and right front side frames and a front end portion of a corresponding one of the left and right side sills, wherein the connection member is fixed at opposite end portions thereof to portions of respective outer peripheries of left and right wheel arch sections of the dashboard panel.

* * * * *